United States Patent
Li et al.

(10) Patent No.: US 11,074,450 B2
(45) Date of Patent: Jul. 27, 2021

(54) PICTURE BOOK IDENTIFICATION METHOD AND APPARATUS AND TERMINAL DEVICE USING THE SAME

(71) Applicant: UBTECH ROBOTICS CORP LTD, Shenzhen (CN)

(72) Inventors: Yang Li, Shenzhen (CN); Jing Gu, Shenzhen (CN); Yue Wang, Shenzhen (CN); Ao Liu, Shenzhen (CN); Jun Cheng, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/726,833

(22) Filed: Dec. 25, 2019

(65) Prior Publication Data
US 2021/0124925 A1    Apr. 29, 2021

(30) Foreign Application Priority Data
Oct. 24, 2019  (CN) .......................... 201911018353.3

(51) Int. Cl.
  *G06K 9/62*   (2006.01)
  *G06K 9/00*   (2006.01)
  *G06T 7/62*   (2017.01)
  *G06T 7/70*   (2017.01)

(52) U.S. Cl.
  CPC ....... *G06K 9/00671* (2013.01); *G06K 9/6202* (2013.01); *G06K 9/6215* (2013.01); *G06T 7/62* (2017.01); *G06T 7/70* (2017.01); *G06T 2207/30244* (2013.01)

(58) Field of Classification Search
  CPC ............. G06K 9/00671; G06K 9/6202; G06K 9/6215; G06T 7/62; G06T 7/70; G06T 2207/30244
  See application file for complete search history.

(56) References Cited

PUBLICATIONS

Nelson, Nicholas, "An Evaluation of Oracle's StillImage Plugin as a Platform for Dynamic Image Search" (2015). Technical Library. 218. (Year: 2015).*

* cited by examiner

*Primary Examiner* — Sean M Conner (57) ABSTRACT

The present disclosure provides a picture hook identification method as well as an apparatus and a terminal device using the same. The method includes; determining geometric parameter(s) of an identification object based on image(s) collected b a camera and internal parameter(s) of the camera; comparing the geometric parameters of the identification object with geometric parameter(s) of a target picture book; and determining the identification object as the target picture book, if a difference between the geometric parameters of the identification object and the geometric parameters of the target picture book is within a preset range. In this manner, the target picture book is further filtered by matching the geometric parameters, which can reduce misidentification to improve the accuracy of identifying the picture book.

17 Claims, 4 Drawing Sheets

Determine geometric parameter(s) of an identification object based on image(s) collected by a camera and internal parameter(s) of the camera — S101

Compare the geometric parameters of the identification object with geometric parameter(s) of a target picture book — S102

Determine the identification object as the target picture book, if a difference between the geometric parameters of the identification object and the geometric parameters of the target picture book is within a preset range — S103

PICTURE BOOK IDENTIFICATION METHOD AND APPARATUS AND TERMINAL DEVICE USING THE SAME

CROSS REFRENCE TO RELATED APPLICATIONS

This application claims priority to Chinese Patent Application No, 20191108353.3, filed Oct. 24, 2019, which is hereby incorporated by reference herein as if set forth in its entirety.

BACKGROUND

1. Technical Field

The present disclosure relates to artificial intelligence technology, and particularly to a picture book identification method as well as an apparatus and a terminal device using the same.

2. Description of Related Art

A picture book is a book with a lot of paintings and a small amount of texts, In the current educational robot products for children, by adding a function to read picture books, it can effectively solve the problem that some parents do not have time to accompany their children to read, and the function gradually becomes an important feature of high-end accompanying robots. For example, reading companion products with the only function of reading companion have also been welcomed and concerned in the education market in the past two years.

When implementing the function of reading companion, the reading companion product usually collects the image of a picture book first, and identifies the page corresponding to the picture book by means of image searching and matching, During the identification based on the similarity of images, the misidentification of the content of the picture book may occur, which is not conducive to ensure the accuracy of the identification of the picture book.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those, skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the, present disclosure with unnecessary detail.

For the purpose of describing the technical solutions of the present disclosure, the following describes through specific embodiments.

Figure 1:
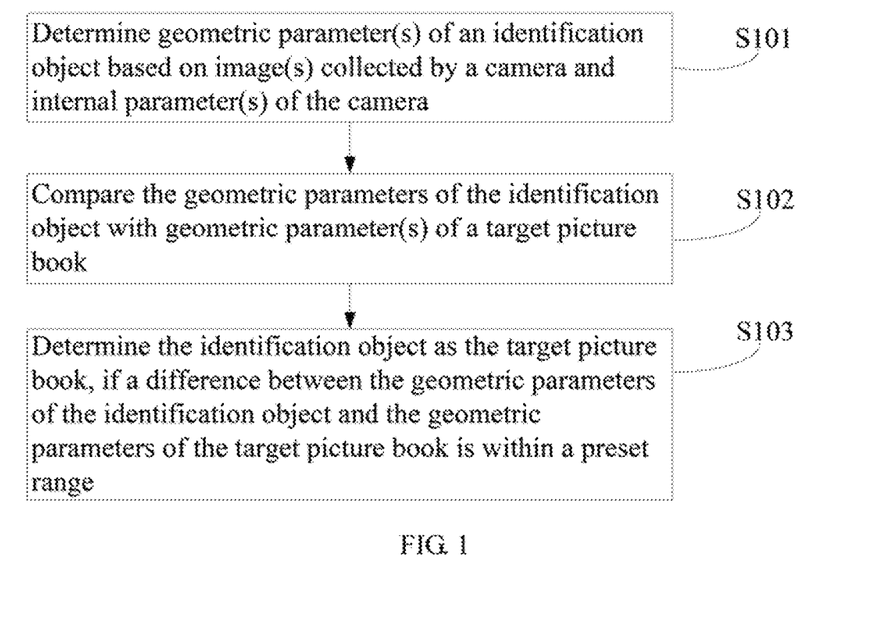
FIG. 1 is a flow chart of a picture book identification method according to an embodiment of the present disclosure.
Figure 3:
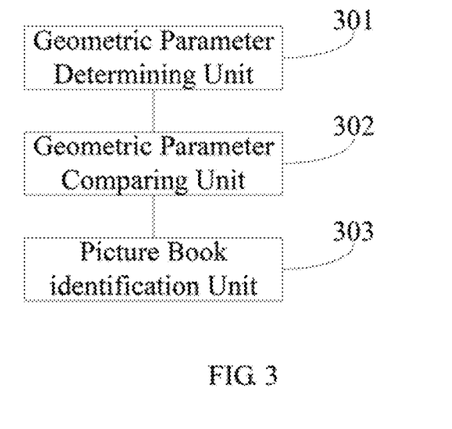
FIG. 3 is a schematic diagram of a picture book identification apparatus according to an embodiment of the present disclosure.
Figure 4:
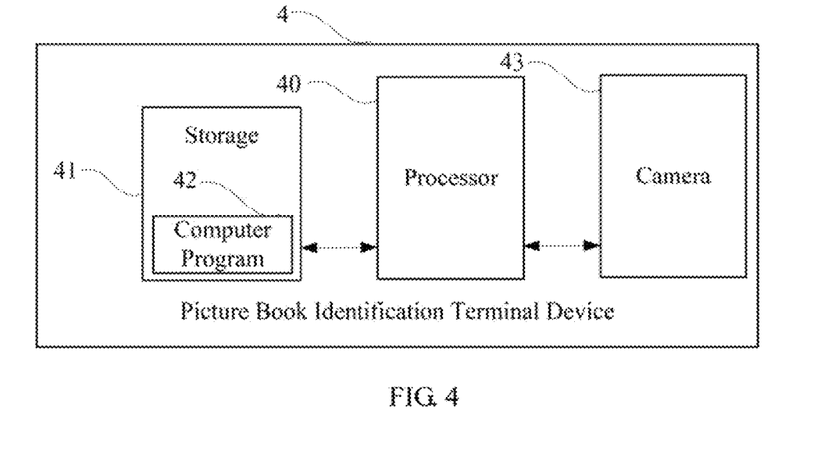
FIG. 4 is a schematic diagram of a picture book identification terminal device according to an embodiment of the present disclosure.

FIG. 1 is a now chart of a picture book identification method according to an embodiment of the present disclosure. In this embodiment, a picture book identification method provided. The method is a computer-implemented method executable for a processor, which may be implemented through and applied to a picture book identification apparatus as shown in FIG. 3 such a robot, or a picture hook identification terminal device as shown in FIG. 4 such a robot. As shown in FIG. 1, the method includes the following steps.

S101: determining geometric parameter(s) of an identification object based on image(s) collected by a camera and internal parameter(s) of the camera.

The internal parameter(s) of the camera can include focal length, zoom range, and pixel size of the camera, which can be determined upon the camera is produced, and generally will not change during use. Therefore, for the same camera, the internal parameters of the camera remain unchanged in a plurality of collected images. Hence, in the calculation process, the factors for the change of the geometric parameters can he determined based on the change of other parameters.

In this embodiment, the camera is disposed on the robot. The geometric parameters of the identification object can include a side length ratio of the identification object and/or angle(s) included in the identification object. In which, the side length ratio of the identification object can be the ratio of the sides of the polygon corresponding to the identification object. For example, when the polygon corresponding to the identification object is a rectangle, the corresponding side length ratio can be the ratio of the length and the width. For other polygon identification object, it can use other styles of side length ratio, for example, the side length ratio corresponding to any two of the unequal side lengths. In addition, it is not limited to the polygon corresponding to the identification object, and can calculate the lines included in the content of the identification object and determine a line length ratio to take as the side length ratio, In this embodiment, the geometric parameters of the identification object can include the angle(s) included in the identification object. For example, the angles can be angles of a polygon corresponding to the identification object. If the identification object is rectangular, it can be the angles of the four corners of the rectangle; and if the identification object is another polygon, it can be the various angles corresponding to the polygon. In addition, the straight angle formed by the lines included in the page of the identification object, or the included angle firmed by the lines in the page and the sides of the identification object can also be taken as the angle(s) in the geometric parameters.

When determining the geometric parameters of the identification object such as the side length ratio or the above-mentioned angle(s), the length of the lines in the identification object can be determined first, and the side length ratio or the above-mentioned angle(s) can be further determined based on the length of the line.

The length of tile lines in the identification object is calculated as follows.

During the use, since the position of the camera is unknown, it is impossible to calculate the external parameters of the camera (e.g., pose information of the camera) in advance. In this case, it can assume the distance from a center of the camera to a plane of the identification object as b.

Figure 2:
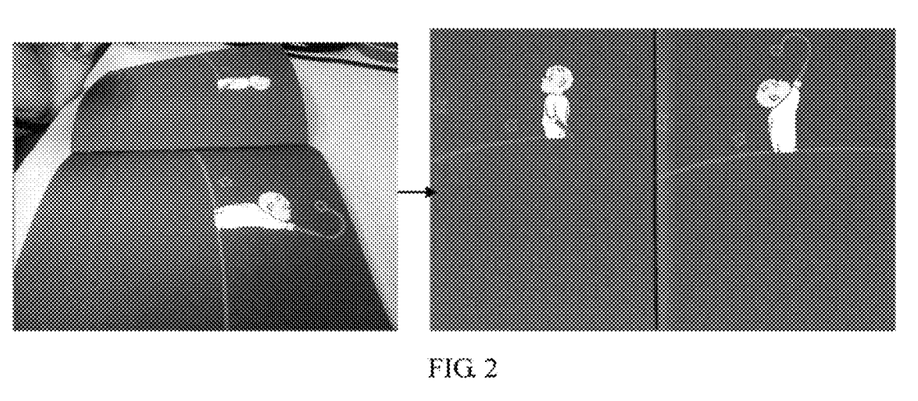
FIG. 2 is a schematic diagram of an example of an identification object and a target picture book according to an embodiment of the present disclosure.

FIG. 2 is a schematic diagram of an example of an identification object and a target picture book according to an embodiment of the present disclosure. As shown in FIG. 2 assuming that the position of the center of the camera is O, the internal parameter of the camera is K, and the plane on which the identification object is located is $\Sigma$. The image collected by the camera (i.e., the left part of FIG. 2) is located at a plane $\Sigma_m$, and it is assumed that the homography transformation from the left part of FIG. 2 to the right part of FIG. 2 is H:$\Sigma_f \to \Sigma_m$ (where, the internal parameters K of the camera is obtained by calibrating the camera in advance, and H is calculated during a comparing, and O and $\Sigma$ are unknown).

A vertical line of the plane $\Sigma$ is made to pass through the center O of the camera and intersect the plane $\Sigma$ and O', and a coordinate system is created by taking O'O as the z-axis (where, the x-axis and y-axis are both in the plane $\Sigma$, which can arbitrarily create a measurement structure which does not affect the plane $\Sigma$).

At this time, the camera matrix P can he expressed as:

$$P = KR[I - C];$$

where, R is the rotation matrix, I is the identity matrix, $C = [0, 0, h]^T$ is the coordinate of the center of the camera, and K is the internal parameter of the camera. Through H, a straight line at infinity from the plane $\Sigma_m$ can be mapped onto $\Sigma_f$ through the formula of $l = H^T*[0, 0, 1]^T$.

In which, the mapping is exactly a projection of the infinite line of the plane $\Sigma$ on the collected image, that is, the vanishing line of the plane. Since the x axis and the y axis are both on the plane $\Sigma$, the vanishing points in the x direction and the y direction are on a straight line l, and the coordinates of the vanishing points to the x direction and the y direction can be calculated first.

The coordinate of the vanishing point in the x direction is:

$$u_x = KR[I-C]*[0,1,0,0]^T = K*r_1;$$ and the coordinate of the vanishing point in the y direction is:

$$u_y = KR[I-C]*[0,1,0,0]^T = K*r_2.$$

Accordingly, it can obtain:

$$l = (K*r_1) \times (K*r_2) = \text{diag}(f, f, f^2)*(r_1 \times r_2) = \text{diag}(f, f, f^2)*r_3;$$

where, the rotation matrix $R = [r_1, r_2, r_3]$, "diag" indicates extracting the diagonal elements, and f is the focal length of the camera.

From the above results, it can salve the formula of:

$$r_3 = \frac{\text{diag}(f^{-1}, f^{-1}, f^{-2})*l}{\|\text{diag}(f^{-1}, f^{-1}, f^{-2})*l\|}.$$

The hallowing calculates the distance between two corresponding point A and point B obtained by mapping any two points (point a and point b) on the collected image on to the plane $\Sigma$. In which, the coordinate of point a is (ax, ay), and the coordinate of point b is (bx, by) then where, $A = [x_a, y_a, 0, 1]^T$. Assuming that $a' = K^{-1}a$, it can obtain:

$$x_a = -h * \frac{r_1^T * a'}{r_3^T * a'}, \quad y_a = -h * \frac{r_2^T * a'}{r_3^T * a'}.$$

Similarly, it can obtain:

$$x_b = -h * \frac{r_1^T * b'}{r_3^T * b'}, \quad y_a = -h * \frac{r_2^T * b'}{r_3^T * b'};$$

where $B = [x_b, y_b, 0, 1]^T$ and $b' = K^{-1}b$.

The inner product of A and B can be expressed as:

$$\langle A, B \rangle = x_a x_b + y_a y_b = h^2 * \frac{r_1^T a' r_1^T b' + r_2^T a' r_2^T b'}{r_3^T a' r_3^T b'} = h^2 * \frac{a'^T (r_1 r_1^T + r_2 r_2^T) b'}{a'^T r_3 r_3^T b'};$$

where, $RR^T = r_1^T r_1 + r_2^T r_2 + r_3^T r_3 = I$, and it can obtain $r_1^T r_1 + r_2^T r_2 = I - r_3^T r_3$ to substitute into the above formula to obtain the inner product of A and B which expressed as $$\langle A, B \rangle = h^2 * \left( \frac{a'^T b'}{a'^T r_3 r_3^T b'} 1 \right).$$

Through the inner product formula, the distance between A and B can be calculated as the following formula which calculates the side length (e.g., 0-1500 mm) of the identification object:

$$d(A,B) = \sqrt{\langle A,A \rangle - 2\langle A,B \rangle + \langle B,B \rangle};$$

where, A and B are two adjacent vertices in the identification object, d(A, B) it the distance between the vertex A and the vertex B, and <A, B> indicates the inner product of the two points A and B and $$\langle A, B \rangle = h^2 * \frac{a'^T (r_1 r_1^T + r_2 r_2^T) b'}{a'^T r_3 r_3^T b'},$$

(a, b) are two points on the obtained image which correspond to the points (A, B), $R = [r_1, r_2, r_3]$ is the rotation matrix, $a' = K^{-1}a$, $b' = K^{-1}b$, and K is the internal parameter of the camera.

It can be seen that, the calculated side length ratio and angle(s) of the identification object are independent of the position of the camera, that is, the obtained side length ratio is a fixed value.

When A and B are the two endpoints of the side length in the identification object, one of the side lengths of the identification object can be calculated according to the above-mentioned formula. Based on the same calculation method, the length of another side can be calculated to obtain the side length ratio of the two sides.

In the above-mentioned manner, alter the distance of any side or line be calculated, the angle of any included angle can be determined according to the determined distance by using the cosine theorem. For example, after calculating the lengths of the three sides of a triangle, any angle in the triangle can be calculated based on the cosine theorem.

S102: comparing the geometric parameters of the identification object with geometric parameter(s) of a target picture book.

In this embodiment, the geometric parameters of a plurality of target picture books are stored in advance. After obtaining the geometric parameters of the identification object through step S101, the geometric parameters of the identification object can be compared with the target picture book to find the target picture book matching the identification object.

S103: determining the identification object as the target picture book, if a difference between the geometric parameters of the identification object and the geometric parameters of the target picture book is within a preset range.

When the difference between the geometric parameters of the identification object and the geometric parameters of the target picture is not within a preset range, it can be the case, that the difference bet cell the side length ratio of the identification object and the side length ratio of the target picture is larger than a predetermined distance (e.g., 0-1500 mm) or the difference between the angles of the identification object and the angles corresponding to the target picture book is larger than a predetermined angle (e.g., 30 degrees).

In addition, if the difference between the geometric parameters of the identification object and the geometric parameters of the target picture is within the preset range, and a similarity between an image content of the identification object and an image content of the target picture book is larger than a predetermined value, it can determine the identification object as the target picture book.

It should be understood that, the sequence of the serial number of the steps in the above-mentioned embodiments does not mean the execution order while the execution order of each process should be determined by its function and internal logic, which should not be taken as any limitation to the implementation process or the embodiments.

FIG. 3 is a schematic diagram of a picture book identification apparatus according to an embodiment of the present disclosure. A picture hook identification apparatus is provided. In this embodiment, the picture book identification apparatus can he disposed on a robot, or be the robot itself. As shown in FIG. 3, the apparatus may include:

a geometric parameter determining unit 301 configured to determine one or more geometric parameters of an identification object based on one or more images collected by a camera and one or more internal parameters of the camera;

a geometric parameter comparing unit 302 configured to comparing the geometric parameters of the identification object with one or more geometric parameters of a target picture book; and a picture book identification unit 303 configured to determine the identification object as the target picture hook, in response to a difference between the geometric parameters of the identification object and the geometric parameters of the target picture book being within a preset range.

In this embodiment, each of the above-mentioned modules/units is implemented in the form of software, which can be computer program(s) stored in a memory of the picture book identification apparatus and executable on a processor of the picture book identification apparatus. In other embodiments, each of the above-mentioned modules/units may be implemented in the form of hardware (e.g., a circuit of the picture hook identification apparatus which is coupled to the processor of the picture book identification apparatus) or a combination of hardware and software a circuit with a single chip microcomputer).

The picture book identification apparatus of FIG. 3 corresponds to the picture book identification method of FIG.

FIG. 4 is a schematic diagram of a picture book identification terminal device according to an embodiment of the present disclosure. In this embodiment, the picture book identification terminal device can be disposed on a robot, or be the robot itself. As shown in FIG. 4, in this embodiment, the picture book identification terminal device 4 includes a processor 40, a storage 41, a computer program 42 stored in the storage 41 and executable on the processor 40, for example, a picture book identification program, and a camera 43. When executing (instructions in) the computer program 42, the processor 40 implements the steps in the above-mentioned embodiments of the picture book identification method. Alternatively, when the processor 40 executes the (instructions in) computer program 42, the functions of each module/unit in the above-mentioned device embodiments.

Exemplarily, the computer program 42 may be divided into one or more modules/units, and the one or more modules/units are stored in the storage 41 and executed by the processor 40 to realize the present disclosure. The one or more modules units may be a series of computer program instruction sections capable of performing a specific function, and the instruction sections are for describing the execution process of the computer program 42 in the picture book. identification terminal device 4. For example, the computer program 42 can he divided into:

a geometric parameter determining unit configured to determine one or more geometric parameters of an identification object based on one or more images collected by a camera and one or, more internal parameters of the camera;

a geometric parameter comparing unit configured to comparing the geometric parameters of the identification object with one or more geometric parameters of a target picture book; and a picture book identification unit configured to determine the identification. object as the target picture book, in response to a difference between the geometric parameters of the identification object and the geometric parameters of the target picture book being within a preset range.

The picture book identification terminal device 4 may be a computing device such as a desktop computer, a notebook computer, a tablet computer, and a cloud server, The picture book identification terminal device 4 may include, but is not limited to, the processor 40 and the storage 41. It can be understood by those skilled in the art that FIG. 4 is merely an example of the picture book identification terminal device 4 and does not constitute a limitation on the picture book identification terminal device 4, and may include more or fewer components than those shown in the figure, or a combination of some components or different components. For example, the picture book identification terminal device 4 may further include an input/output device, a net access device, a bus, and the like.

The processor 40 may he a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the picture look identification terminal device 4, for example, a hard dish or a memory of the picture book identification terminal device 4. The storage 41 may also be an external storage device of the picture book identification terminal device 4, for example, a plug-in hard disk, a smart media card (SMC), a secure digital (SD) card, flash card, and the like, which equipped on the picture book identification terminal device 4. Furthermore, the storage 41 may further include both an internal storage unit and an external storage device, of the picture book identification terminal device 4. The storage 41 is configured to store the computer program 42 and other programs and data required by the picture book identification terminal device 4. The storage 41 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to he performed by different functional units according to requirements, that is, the internal structure of the device may he divided into different functional units or nodules to complete all or part of the above-mentioned functions. The functional units and modules in the embodiments may he integrated in one processing; unit, or each unit may exist alone physically, or two or more units may be integrated in one unit. The above-mentioned integrated unit may be implemented in the than of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may he made to the corresponding processes in the above-:mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/picture book identification apparatus and method may be implemented in other manners. For example, the above-mentioned apparatus/picture book identification apparatus embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and ma also he electrical, mechanical or other forms.

The units, described as separate components may or may not be physically separated. The components represented as units may or may not be physical units, that is, may he located in one place or be distributed to multiple, network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also he implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. it should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do net make the essence of the corresponding technical schemes depart from the spirit and scope of the technical schemes of each of the embodiments of the present disclosure, and should be included within the scope of the present disclosure.

What is claimed is:

1. A computer-implemented picture book identification method, comprising executing on a processor steps of:
   determining one more geometric parameters of an identification object based on one or more images collected by a camera and one or more internal parameters of the camera;
   comparing the geometric parameters of the identification object with one or more geometric parameters of a target picture book; and determining the identification object as the target picture book, in. response to a difference between the geometric parameters of the identification object and the geometric parameters of the target picture book being within a preset range;

wherein the step of determining the one or more geometric parameters of the identification object based on the one or more images collected by the camera and the one or more internal parameters of the camera comprises:

determining a side length of the identification object based on the collected images and the internal parameters of the camera, and determining a side length ratio of the identification object based on the determined side lentgh; and determining one or more angles comprised in the identification object based on the collected images and the internal parameters of the camera.

2. The method of claim 1, wherein the step of determining the side length of the identification object based on the collected images and the internal parameters of the camera comprises:

calculating the side length of the identification object based on the formula of $d(A,B)=\sqrt{<A,A>-2<A,B>+<B,B>}$, where A and B are two adjacent vertices of the identification object, d (A, B) is a distance between the vertex A and the vertex B, <A, B> is an inner product of the vertex A and the vertex B and $$\langle A, B \rangle = h^2 * \frac{a'^T(r_1 r_1^T + r_2 r_2^T)b'}{a'^T r_3 r_3^T b'},$$

(a, b) are two points corresponding to the above-mentioned vertices A and B on the collected images, R=[$r_1$, $r_2$, $r_3$] is a rotation matrix, a'=$K^{-1}$a, b'=$K^{-1}$b, and K is an internal parameter of the camera.

3. The method of claim 1, wherein the step of determining the angle comprised in the identification object based on the collected images and the internal parameters of the camera comprises:

calculating a side length of a triangle comprising the angle based on the collected images and the internal parameters of the camera; and calculating the angle through the cosine theorem based on the calculated side length of the triangle.

4. The method of claim 1, wherein the angles comprised in the idenffication object comprise one or more angles formed by at least one of one or more angles of a page of the identification object and one or more angles composed of lines in the page of the identification object.

5. The method of claim 1, wherein the side length ratio of the identification object is aside length ratio of two adjacent sides of the identification object.

6. The method of claim 1, further comprising:

obtaining a similarity between a page image of the identification object and a page image of the target picture book, in response to the difference between the geometric parameters of the identification object and the geometric parameters of the target picture book being within the preset range; and determining the identification object as the target picture book identification object, in response to the similarity being larger than a predetermined threshold.

7. A picture book identification apparatus, comprising:

a geometric parameter determining unit configured to determine one or more geometric parameters of an identification object based on one or more images collected by a camera and one or more internal parameters of the camera;

a geometric parameter comparing unit configured to comparing the geometric parameters of the identification object with one or more geometric parameters of a target picture book; and a picture book identification unit configured to determine the identification object as the target picture book, in response to a difference between the geometric parameters of the identification object and the geometric parameters of the target picture book being within a preset range;

wherein the geometric parameter determining unit is configured to:

determine a side length of the identification object based on the collected images and the internal parameters of the camera, and determine a side length ratio of the identification object based an the determined side length; and determine one or more angles comprised in the identification object based on the collected images and the internal parameters of the camera.

8. The apparatus of claim 7, wherein the geometric parameter determining unit is configured to determine the side length of the identification object based On the collected images and the internal parameters of the camera by:

calculating the side length of the identification object based on the formula of $d(A,B)=\sqrt{<A,A>-2<A,B>+<B,B>}$, where A and B are two adjacent vertices of the identification object, d (A, B) is a distance between the vertex A and the vertex B, <A, B > is an inner product of the vertex A and the vertex B and $$\langle A, B \rangle = h^2 * \frac{a'^T(r_1 r_1^T + r_2 r_2^T)b'}{a'^T r_3 r_3^T b'},$$

(a, b) are two points corresponding to the above-mentioned vertices A and B on the collected images, R=[$r_1$, $r_2$, $r_3$] is a rotation matrix, a'=$K^{-1}$a, b'=$K^{-1}$b, and K isan internal paranieter of the camera.

9. The apparatus of claim 7, wherein the geometric parameter determining unit is configured to determine the angles comprised in the identification object based on the collected images and the internal parameters of the camera by:

calculating a Side length of a triangle comprising the angle: based on the collected images and the internal parameters of the camera; and calculating the angle through the cosine theorem based on the calculated side length of the triangle.

10. The apparatus of claim 7, wherein the angles comprised in the identification object comprise one or more angles formed by at least one of one or more angles of a page of the identification object and one or more angles composed of lines in the page of the identification object.

11. The apparatus of claim 7, wherein the side length, ratio of the identification object is a side length ratio of two adjacent of the identification object.

12. A picture book identification terminal device, comprising;
a camera;
a memory;
a processor; and
one or more computer programs stored in the memory and executable on the processor, wherein the one more computer programs comprise;
instructions for determining one or more geometric parameters of an identification object based on one or more images collected by the camera and one or more internal parameters of the camera;
instructions for comparing the geometric parameters of the identification object with one or more geometric parameters of a target picture book; and
instructions for determining the identification object as the target picture book, in response to a difference between the geometric parameters of the identification object and the geometric parameters of the target picture book being within a reset range;
wherein the instructions for determining the one or more geometric parameters of the identification object based on the one or more images collected by the camera and the one or more internal parameters of the camera comprise:
instructions for determining a side length of the identification object based on the collected images and the internal parameters of the camera, and determining a side length ratio of the identification object based on the determined side length; and
instructions for determining one or more angles comprised in the identification object based on the collected images and the internal parameters of the camera.

13. The terminal device of claim 12, wherein the instructions for determining the side length of the identification object based on the collected images and the internal parameters of the camera comprise:
instructions for calculating the side length of the identification object based on the formula of $d(A,B)=\sqrt{<A,A>-2<A,B>+<B,B>}$, where A and B are two two adjacent vertices of the identification object, d (A, B).

is a distance between the vertex A and the vertex B, <A, B > is art inner product of the vertex A and the vertex B and $$\langle A, B \rangle = h^2 * \frac{a'^T(r_1 r_1^T + r_2 r_2^T)b'}{a'^T r_3 r_3^T b'},$$

(a, b) are two points corresponding to the above-mentioned vertices A and B on the collected images, $R=[r_1, r_2, r_3]$ is a rotation matrix, $a'=K^{-1}a$, $b'=K^{-1}b$, , and K is an internal parameter of the camera.

14. The terminal, device of claim 12 wherein the instructions for determining the angle comprised in the identification object based on the collected images and the internal parameters of the camera comprise:
instructions for calculating a side length of a triangle comprising the angle based on the collected images and the internal parameters of the camera; and
instructions for calculating the angle through the cosine theorem based on the calculated side length of the triangle.

15. The terminal device of claim 12, wherein the angles comprised in the identification object comprise one or more angles formed by at least one of one or more angles of a page of the identification object and one or more angles composed of lines in the page of the identification object.

16. The terminal device of claim 12, wherein the side length ratio of the identification object is a side length ratio of two adjacent sides of the identification object.

17. The terminal device of claim 12, wherein the one or more computer programs further comprises:
instructions for obtaining a similarity between a page image of the identification object and a page image of the target picture book, in response to the difference between the geometric parameters of the identification object and the geometric parameters of the target picture book being within the preset range; and
instructions for determining the identification object as the target picture book identification object, in response to the similarity being larger than a predetermined threshold.

* * * * *